United States Patent
Connor

(10) Patent No.: US 7,953,069 B2
(45) Date of Patent: May 31, 2011

(54) DEVICE AND METHOD FOR ESTIMATING AUDIOVISUAL QUALITY IMPAIRMENT IN PACKET NETWORKS

(75) Inventor: Kevin Joseph Connor, Blaine, WA (US)

(73) Assignee: Cisco Technology, Inc., San Jose, CA (US)

( * ) Notice: Subject to any disclaimer, the term of this patent is extended or adjusted under 35 U.S.C. 154(b) by 1275 days.

(21) Appl. No.: 11/406,735

(22) Filed: Apr. 18, 2006

(65) Prior Publication Data
US 2007/0242662 A1 Oct. 18, 2007

(51) Int. Cl.
*H04L 12/66* (2006.01)

(52) U.S. Cl. .................. 370/352; 370/250; 370/252

(58) Field of Classification Search .................. None
See application file for complete search history.

(56) References Cited

U.S. PATENT DOCUMENTS 6,654,463 B1 * 11/2003 Leonidov et al. ........ 379/406.08
2004/0071084 A1 * 4/2004 El-Hennawey et al. ...... 370/230
* cited by examiner

*Primary Examiner* — Nathan Flynn
*Assistant Examiner* — Justin N Mullen
(74) *Attorney, Agent, or Firm* — Stolowitz Ford Cowger LLP

(57) ABSTRACT

An audio and/or visual transmission quality device estimates transmission quality as perceived by a user based on observation and processing of objective metrics. The device preferably includes a primary integrator to generate an instantaneous estimate of user annoyance based on occurrence of frame loss events in a received signal. The device further preferably includes secondary integrators to process the instantaneous estimate of user annoyance in selected time intervals and generate a plurality of time-varying estimates of user annoyance valid over the selected time intervals. The device may further include a plurality of scaling modules to scale the plurality of time-varying estimates and generate a corresponding plurality of estimates of transmission quality as perceived by the user. The device may further include a modulation network to modify a sensitivity of the primary integrator to the occurrence of frame loss events in the received signal.

35 Claims, 4 Drawing Sheets

DEVICE AND METHOD FOR ESTIMATING AUDIOVISUAL QUALITY IMPAIRMENT IN PACKET NETWORKS

BACKGROUND OF THE INVENTION

1. Field of the Invention

The invention relates generally to audiovisual transmission quality measurement and, more particularly, to a device and method for estimating subjective audiovisual quality impairment due to transmission impairments, such as packet loss and jitter, in frame-based multimedia transmission networks.

2. Description of the Related Art

It is a long-standing problem in psychology to discover objective, numerical metrics which can be used to predict subjective or human experiences of audiovisual quality. Examples of objective metrics in the field of audio measurement include signal-to-noise ratio, signal level or loudness, transmission delay, and loudspeaker frequency response. Human perceptions of audiovisual quality are typically probed using psychometric methods such as Mean Opinion Score (MOS) tests, in which panels of listeners are exposed to a series of audio samples and asked to rate the quality of the samples on a five-point scale (1=poor, 5=excellent). By this method and by averaging the responses of many human subjects, various conditions can be ranked numerically. However, such tests are costly, time-consuming, and require human subjects. Hence, such tests are not suited to real-time applications such as monitoring the "health" of a telecommunications network servicing thousands of simultaneous telephone calls.

There is a need to monitor or predict the "user quality experience" in a variety of telecommunications systems via automatic processes in real-time, in which the ultimate receiver is a human perceiving an audio or video signal. Therefore, an estimate or prediction of a subjective, human response (such as the voice quality MOS score discussed above) based on objective, numerical information sources which are available or observable is desirable.

SUMMARY OF THE INVENTION

An apparatus and method generate estimates of human, subjective responses of audio and/or video quality based on observation and processing of objective metrics. One aspect of the invention is a network device that preferably includes a primary integrator that generates an instantaneous estimate of user annoyance based on occurrence of frame loss events in a received signal. The device may also include secondary integrators that process the instantaneous estimate of user annoyance in selected time intervals and generate a plurality of time-varying estimates of user annoyance valid over the selected time intervals.

Another aspect of the invention is a method that includes monitoring the occurrence of lost packets in a received signal and generating an instantaneous estimate of user annoyance based on the occurrence of lost packets in the received signal. The method may also include generating a plurality of estimates of the transmission quality as perceived by the user corresponding to the plurality of estimates of user annoyance valid in the selected time intervals. The method may further include receiving a plurality of modulating signals, each modulating signal comprising an objective measure of a media content characteristic having an effect on the importance of the lost packet to user annoyance.

BRIEF DESCRIPTION OF THE DRAWINGS

The above and other features and advantages of embodiments of the invention will become readily apparent by reference to the following detailed description when considered in conjunction with the accompanying drawings.

DETAILED DESCRIPTION OF THE EMBODIMENTS

As will be apparent to those skilled in the art from the following disclosure, the invention as described herein may be embodied in many different forms and should not be construed as limited to the specific embodiments set forth herein. Rather, these embodiments are provided so that this disclosure will fully convey the principles of the invention to those skilled in the art.

User perception of "quality" in frame-based, multimedia transmission networks may be affected by a variety of network impairments including delay, packet loss, jitter, and distortions due to coding/decoding techniques. Since these network impairments are time-varying, quality in packet networks is also time-varying. The quality of the transmission channel plays an important part in the overall quality of experience for the human user. Therefore, monitoring the performance of the transmission channel can provide sources of information for predicting the user-perceived quality of telephone calls, music, television, or other media or multimedia content.

Embodiments of the invention relate to a device and method for generating estimates of human, subjective responses of audio and/or video quality based on observation and processing of objective metrics. For example, in a Voice over Internet Protocol (VoIP) network, objective quantities such as packet loss rates, codec (COder/DECoder) algorithms, and signal levels can be monitored, either in real-time or offline, by a variety of devices. These objective metrics of transmission channel performance may be combined and/or transformed to form a running estimate of the voice quality perceived by an "average" human viewer or listener at that instant or over various time windows.

Figure 1:
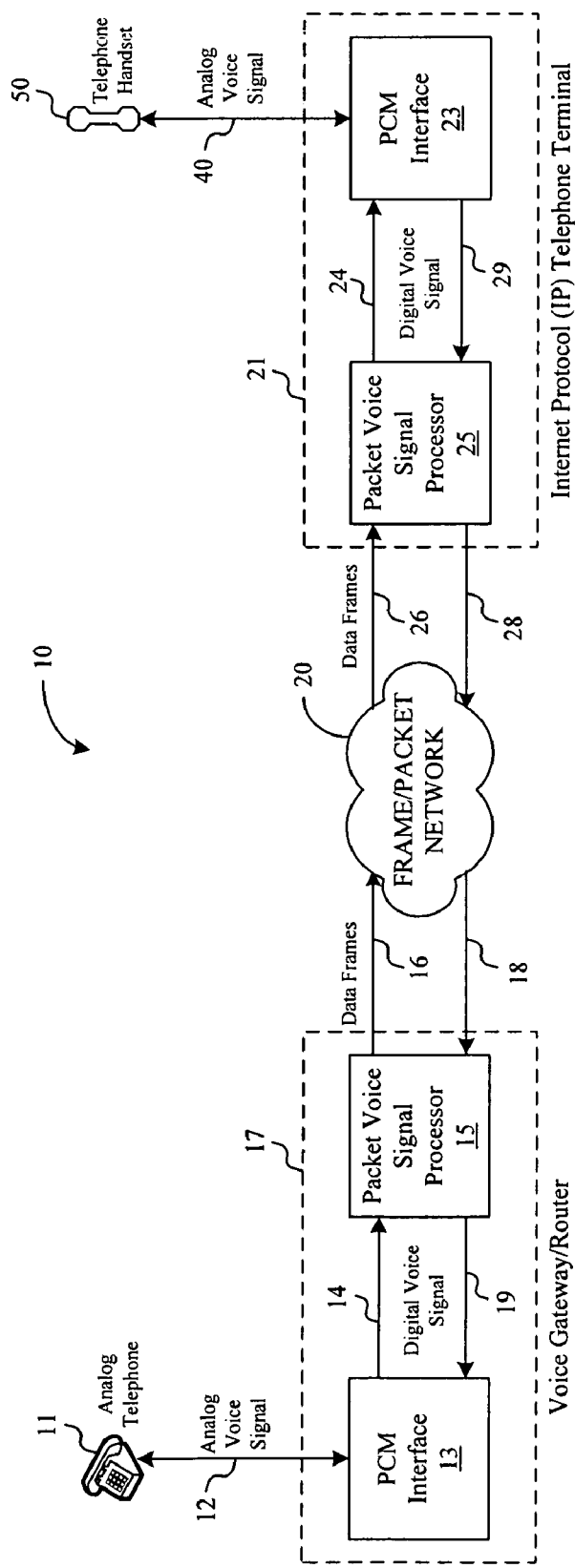
FIG. 1 is a diagram of a Voice over Internet Protocol (VoIP) network in which embodiments of the invention may be implemented.

FIG. 1 is a diagram of a typical VoIP network 10 in which embodiments of the invention may be implemented. The VoIP network 10 is used for illustration purposes only and the invention need not be limited to predicting voice quality in VoIP networks. Embodiments of the invention may also be extended to predicting quality of other media content, such as speech, music, audio and video, in which digital or frame-based processing is used for distribution. This includes, for instance, the Internet, multi-party and two-way communication systems such as VoIP or Television over IP (TVoIP), digital cellular telephone networks, satellite and wireless networks, videoconferencing sessions and one-way audio/video delivery systems, such as frame based, digital music players and networks, or satellite television.

Referring to FIG. 1, the VoIP network 10 provides full-duplex voice communications between two users' telephones 11, 21. A traditional analog telephone 11 may be connected to a frame or packet network 20 via a voice gateway/router 17.

The telephone 21 may be an IP telephone device which may be connected to the packet network 20 directly. Both the voice gateway 17 and the IP telephone 21 convert analog voice signals 12, 40 into streams of data packets 16, 26, and vice-versa 28, 18. The voice gateway 17 and the IP telephone 21 may also be referred to as VoIP endpoints as they represent the termination points of an IP communications session.

In FIG. 1, the analog voice signal 12 from the analog telephone 11 may be converted into a digital voice signal 14 by a Pulse Code Modulation (PCM) interface 13. Blocks of PCM samples 14 may be passed to the Packet Voice Signal Processor (PVSP) unit 15 which preferably converts the digital voice signal 14 into a packet format 16 suitable for transmission across the packet network 20. At the receiving VoIP endpoint 21, incoming packets 26 are sent to the receiving PVSP unit 25, where incoming data packets 26 may be converted back into a digital voice signal 24 and subsequently converted into an analog voice signal 40 which is then played out of the handset 50 of the receiving VoIP endpoint 21. An identical process may be followed in the opposite direction wherein the digital voice signal 29 is transmitted from the VoIP endpoint 21 to the VoIP endpoint 17, permitting full-duplex conversations in which both users can talk and listen simultaneously.

Figure 2:
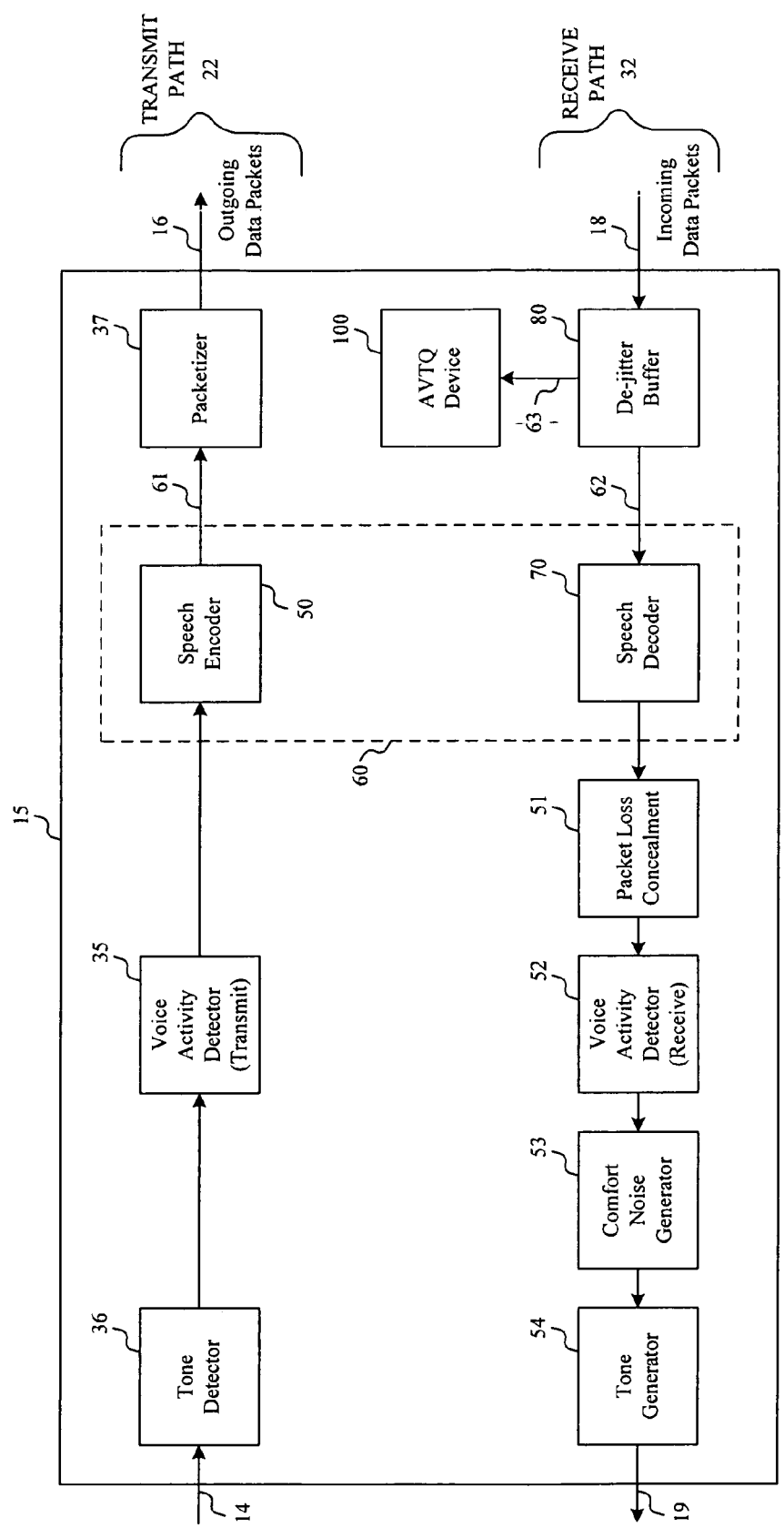
FIG. 2 is a block diagram of a Packet Voice Signal Processor (PVSP) unit in a VoIP endpoint of FIG. 1, according to one embodiment of the invention.

FIG. 2 is a block diagram of the PVSP unit 15 in the VoIP endpoint 17 of FIG. 1. The PVSP unit 25 in the VoIP endpoint 21 may be similarly constructed. Hence, the description of the PVSP unit 25 is omitted.

The PVSP unit 15 performs two main functions: a TRANSMIT function in which digital speech signals 14 from a local user's handset microphone are converted into outgoing data packets 16 and sent to a remote user, and a RECEIVE function in which incoming packets 18 from the remote user are converted back to speech signals 19, which are sent to the local user's handset earpiece. By monitoring the performance of the RECEIVE path 32, objective metrics may be observed, combined and/or transformed to predict the voice quality as would be perceived by the user.

The transmit path 22 of the PVSP unit 15 may include a tone detector 36, a voice activity detector 35, a speech encoder 50, and a packetizer 37. Packetization is the process by which frames of encoded audio data 61 from the speech encoder 50 are grouped into data packets 16 suitable for transmission over the packet network 20 (FIG. 1). The function of the speech encoder 50 is data compression, to reduce the size (in bytes) of the signal which needs to be transmitted. The complementary function, data expansion or decoding of compressed signals, is performed on incoming data packets in the receive path at a speech decoder 70. Together, the encoder 50 and the decoder 70 constitute a codec device 60. An example speech codec is ITU standard G.729A. An example video codec is ITU standard H.264. The coding/decoding process represents a tradeoff between quality and data size; thus, the codec itself may be a major source of quality degradation. Multimedia codecs are typically "lossy." That is, codecs do not reproduce input signals perfectly. Generally, the more severe the compression, the more "lossy" the process and the greater the degradation of the signal observed at the output. Codecs also vary greatly in their robustness to packet loss. That is, while some codecs may perform admirably when 5% of the packets are lost, other codecs may be intolerably degraded with 5% loss. Hence, the choice of codec is a primary factor in the overall quality of the transmission.

The receive path 32 of the PVSP unit 15 may include a de-jitter buffer 80, the speech decoder 70, a packet loss concealment block 51, a voice activity detector 52, a comfort noise generator 53, and a tone generator 54. The de-jitter buffer 80 supplies frames of encoded speech data 62 to the speech decoder 70 at a constant rate. Various network impairments can disrupt this steady flow, resulting in failure of the de-jitter buffer 80 to supply a fresh speech frame 62 to the speech decoder 70 when one is needed.

To monitor the performance of the receive path 32 and form an estimate of the user perceived voice quality, the receive path 32 preferably includes an Audio/Visual Transmission Quality (AVTQ) device 100 to monitor the interaction between the de-jitter buffer 80 and the decoder 70. The AVTQ device 100 monitors the success or failure of the transaction between the de-jitter buffer 80 and the decoder 70, for every frame 62.

Referring back to the VoIP network 10 of FIG. 1, voice packets 16 are preferably sent from the VoIP endpoint 17 in a continuous stream with packets spaced evenly apart, i.e., at a constant rate, during periods of active speech. However, due to the vagaries of transmission in the packet network 20, these packets 26 arrive asynchronously at the receiving VoIP endpoint 21, i.e., with random variation in arrival times. This jitter, or variation between when a voice packet is expected and when it is actually received, may lead to discontinuities in the output voice stream sent to the listener when packets arrive "too late" for timely playout.

Referring again to FIG. 2, the variations in inter-packet arrival times are typically smoothed out by the de-jitter buffer 80, also known as a playout buffer, in the endpoints 17, 21. The de-jitter buffer 80 provides smooth, uninterrupted playout of audio at the receiver, under conditions of asynchronous packet arrival. The de-jitter buffer device 80 temporarily stores incoming packets 18 and delivers frames of coded audio 62 (which are the content or "payload" of the packets 18) at a constant rate to the decoder 70, where they are decoded or transformed back into a digital audio signal 19. This is a standard process by which the decoder 70 can be "fed" at constant intervals when the input occurs with some randomness in time. The decoder 70 must be fed on an exact schedule (for example, every 5 or 10 ms). If the de-jitter buffer 80 underflows (i.e., a slot remains empty, as in the case of an excessively late packet), the decoder 70 may be unable to obtain a coded speech frame 62 from the de-jitter buffer 80 when one is required. This may be referred to as a Decoder Frame Loss (DFL) event. DFL events may cause disruptions in the PCM audio output 19, resulting in user annoyance. Every request from the decoder 70 to the de-jitter buffer 80 for a new coded frame 62 may result in either a successful fetch (OK) or a DFL event (NOT OK) if no frame 62 is available. An ongoing record of the success or failure of these fetches from the de-jitter buffer 80 may be referred to as a DFL vector 63. The DFL vector 63 preferably forms a primary input to the AVTQ device 100. Additional sources of input to the AVTQ device 100 may include the outputs of any of the other devices 70 and 51-54 which may comprise the receive path of the PVSP unit 15. For example, a speech/silence detection and signal level estimate of the receiver voice activity detector 52 may be employed as additional inputs to the AVTQ device 100. For clarity, these paths are not shown in FIG. 2 but will be discussed further below with reference to FIGS. 3 and 4.

When packets fail to arrive on time at the receiver or fail to arrive at all, resulting in a DFL event, various means of packet loss concealment (PLC) 51 may be used to help mask the effects of these lost or discarded packets. PLC methods typically involve the use of previously received speech samples to generate synthetic speech to conceal the gap. However, these PLC techniques are generally effective only for small numbers of consecutive lost packets or low packet loss rates. Thus, as the number of DFL events increases, user annoyance increases.

Special packets may be sent by the endpoints 17, 21 to indicate conditions of talker silence or the presence of machine tones such as DTMF tones or fax/modem signaling tones. Rather than sending the actual encoded signal of the machine tones, it is more efficient to send special "flag" packets which contain information about the nature of the tone or background noise signal. Thus, if the incoming packet stream 18 contains one of these tone or noise "flag" packets, the PVSP unit 15 preferably generates a new tone or noise signal at the receiver and inserts it into the digital audio path 19. These tone and noise signals may be generated by the tone generator 54 and comfort-noise generator 52, respectively.

Some PSVP units 15 may incorporate the voice activity detector 52 in the receive path 32, in addition to the voice activity detector 35 typically found in the transmit path 22. The voice activity detectors 35, 52 preferably report the current state of the observed audio signal as being either active speech or silence. The voice activity detectors 35, 52 may also report the level (or "volume") of the audio signal which is being observed.

Figure 3:
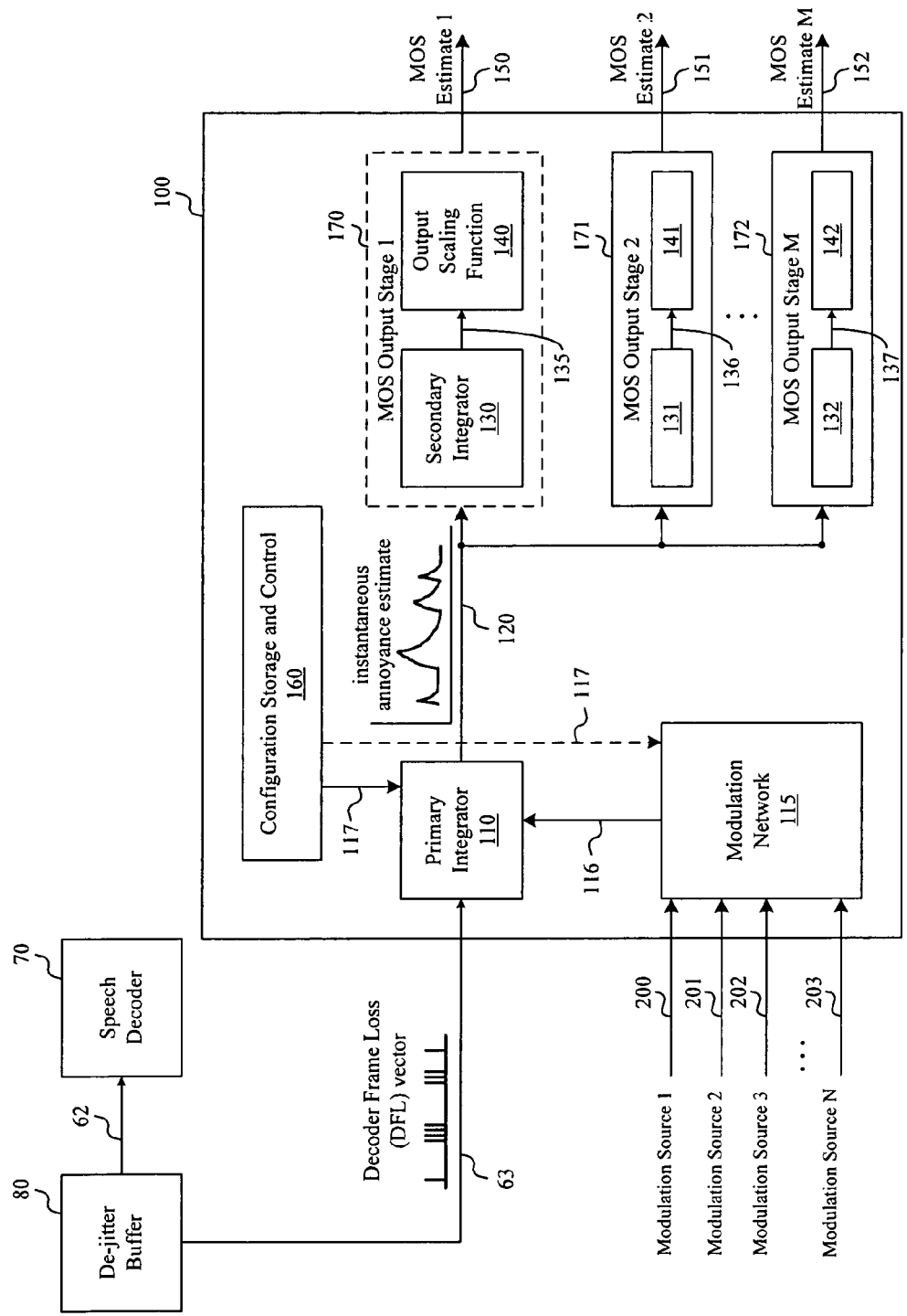
FIG. 3 is a block diagram of an Audio/Visual Quality Transmission (AVTQ) device in a PVSP unit of FIG. 2, according to another aspect of the invention.

FIG. 3 is a block diagram of the AVTQ device 100 in FIG. 2. The AVTQ device 100 preferably includes a primary integrator (PI) unit 110 and a plurality of MOS output stages 170-172 comprising secondary integrator units 130-132 and output scaling function modules 140-142, respectively. The AVTQ device 100 may further include a configuration storage and control unit 160 and a modulation network 115.

A DFL vector 63 is preferably fed to the PI unit 110. The PI unit 110 then processes the input vector 63 and produces a time-smoothed output signal 120 preferably using a recursion relation that may be implemented with, for example, a digital Infinite Impulse Response (IIR) filter. In a recursion relation, a short history of past outputs is "remembered" by the device, in addition to the present input. In one embodiment, the input DFL vector 63 may be binary valued (0, 1), and the output signal 120 of the PI unit 110 may be real-valued. The PI unit 110 preferably produces one output value for each input value. Each input/output step may represent, for example, 5 or 10 ms of time, depending on the basic frame size of the codec. Coefficients and initial settings of the PI unit 110 are preferably loaded from the configuration storage and control unit 160 when the PI unit 110 is initialized.

As discussed above, the AVTQ device 100 preferably monitors the interaction between the de-jitter buffer 80 and the speech decoder 70. The AVTQ device 100 preferably observes the DFL vector 63, the record of DFL events that may comprise an ordered list by which a frame-by-frame binary time series of decoder frame events (for example, OK=0 and NOT OK=1) can be reproduced; thus, (OK, OK, OK, OK, NOT OK, OK, OK, OK) may be represented as (0, 0, 0, 0, 1, 0, 0, 0).

The AVTQ device 100 then processes the DFL vector 63 in the PI unit 110 as the DFL vector 63 evolves over time to produce time-varying estimates 150-152 of the audio and/or visual quality on a five-point MOS scale. The time-smoothed output signal 120 of the PI unit 110 is preferably a time-varying digital signal, with an amplitude that is roughly proportional to the density of decoder frame loss events (the "NOT OK" events represented by a "1") in the DFL vector 63. Therefore, since user annoyance is roughly proportional to intensity of frame loss, the output signal 120 may represent a moving estimate of the user's annoyance at any instant. For example, as "1s" representing the "NOT OK" DFL events occur, the output signal 120 of the PI unit 110 increases rapidly. If subsequent DFL vector values are all "0s" or "OK" (that is, the packets have been decoded normally), the output signal 120 will be seen to decrease gradually. This fast attack and gradual decay behavior is a characteristic of integrating filters, which is also a characteristic of many human perceptual processes. A linear integrator device provides only simple time integration of an input sequence, using constant coefficients. To account for the fact that DFL events may not be equal in their perceptual impact to users, the PI unit 110 is preferably a non-linear (employs time-varying coefficients) integrator device.

The output signal 120 of the PI unit 110 is a short-term signal representing "instantaneous user annoyance" (the annoyance experienced by a person with a tremendously short memory). The output signal 120 of the PI unit 110 may be resolved into a "quality" metric, which is essentially inversely proportional to annoyance. That is, high quality means low annoyance. Because a single time-window of interest cannot be specified in advance for all content types (speech, music, video), the AVTQ device 100 preferably includes the plurality of MOS output stages 170-172 to estimate MOS scores 150-152 over several time windows simultaneously. For example, a quality metric may be provided for a particular time window, such as "quality in the past one second," or "quality over the past minute."

The MOS output stages 170-172 include the secondary integrator units 130-132 and the output scaling function modules 140-142, respectively. The time window of each MOS output stage 170-172 is preferably set by the Configuration Storage and Control Unit 160. The secondary integrator units 130-132 preferably perform a simple time-integration of the annoyance estimate 120 over various time windows (for example, 1 sec, 10 sec, 60 sec, etc.) to produce output signals 135-137, respectively, which are estimates of annoyance valid over the corresponding time window. Time-integration refers to a summation of the area under the curve of the output signal 120, over a given period. The integration function of the secondary integrator units 130-132 may be performed by standard signal processing techniques known to those skilled in the art, including simple addition of the samples of the annoyance signal 120 over the stated interval or use of digital filters.

The output scaling function modules 140-142 preferably provide scaling and final corrections to the output signals 135-137 of the secondary integrator units 130-132 to produce MOS quality estimates 150-152 on a five-point MOS scale. The output scaling function modules 140-142 preferably comprise normalization and polynomial evaluation steps. The normalization step may be a simple division by a constant, to correct for differences in integration window size. The polynomial evaluation step may represent a final scaling function of the form $y = a0 + a1.x + a2.x^2 \ldots + aN.x^n$, where y represents the final MOS score 150, and x represents the normalized annoyance score. The coefficients of the scaling polynomial, [a0, a1, ..., aN], are preferably pre-computed tabular values corresponding to the choice of media codec 60 and may be loaded from the configuration storage and control unit 160. The implementation of a polynomial calculation is a standard technique of digital signal processing and well-known to those skilled in the art.

The outputs 150-152 of the respective MOS output stages 170-172 are preferably running MOS scores. That is, the MOS outputs 150-152 are updated with each input value of the DFL vector 63 clocked into the AVTQ device 100. Each MOS output 150-152 is preferably a value which has validity over the corresponding time window (1 sec, 10 sec, 60 sec, etc). The MOS score valid over a 10-second window may be compared to the mental state of a user who can only remember events occurring in the past 10 seconds. Although the user has an opinion at any given instant and not just at particular intervals, the user's opinion is only valid over the past ten seconds.

As described above, the DFL vector 63 provides the primary input to the AVTQ device 100. Since some DFL events may be more "perceptually important" than other DFL events, additional input streams 200-203 relating to the media content may be employed through the action of the modulation network 115 to continuously modify the internal states of the AVTQ device 100 as it performs the transformation of the DFL vector 63. The internal state of the PI unit 110 may be modified, frame by frame, by the modulation signal 116 output from the modulation network 115. The modulation signal 116 preferably causes a temporary increase or decrease in the sensitivity of the filtering characteristic of the PI unit 110, corresponding to an estimated "importance" of the DFL vector 63 at that moment.

The modulation network 115 preferably generates a moment-by-moment multiplier or weighting factor corresponding to how perceptually "important" or "annoying" a DFL event might be at that particular instant, so that the effect of the DFL event on the instantaneous annoyance estimate 120 may be correspondingly increased or decreased. For example, a frame loss event occurring when the talker is silent and the telephone signal consists only of background noise may be considered to be of less consequence than a frame loss event occurring in the middle of a word. Thus, for example, the former DFL event may be given a weight of 0.1, while the latter event may be given a weight of 2. There are a number of variables that may be relevant to the subjective "importance" of a particular DFL event and these variables may be monitored, individually weighted, and summed in the modulation network 115 to form the modulation signal 116. Although the AVTQ device 100 may be applicable to all media types, the choices of modulation sources, their relative weights, and the summation function are a set of parameters that are application dependent (speech, music, video).

Figure 4:
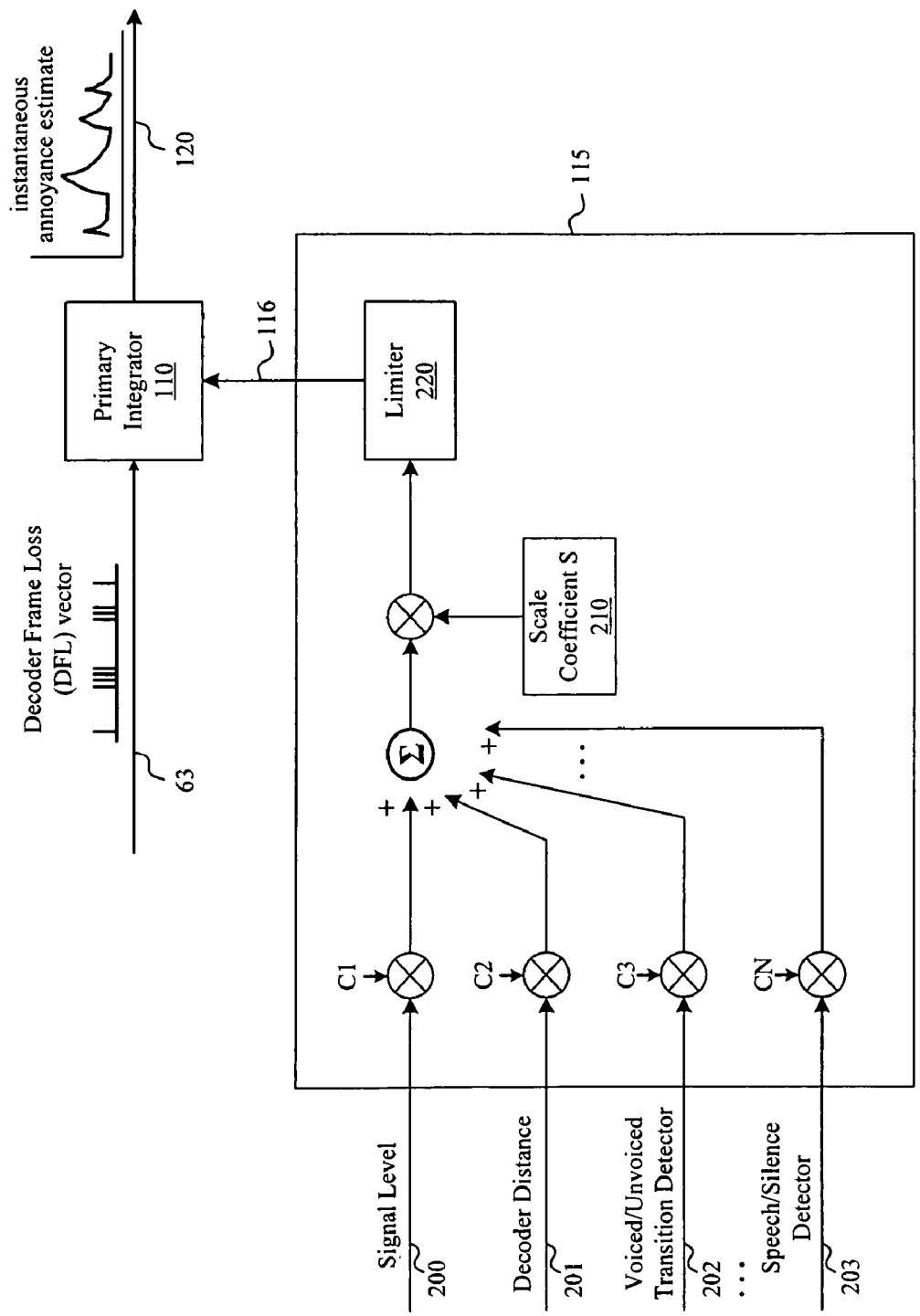
FIG. 4 is a block diagram of one embodiment of a modulation network in an AVTQ device of FIG. 3, according to a still further aspect of the invention.

FIG. 4 shows a block diagram of one embodiment of the modulation network 115 of FIG. 3 having a set of modulators. Embodiments of AVTQ devices 100 dedicated to particular media types (speech, music, video, etc) may be distinguished by particular sets of modulators, their weights, and connections to the PI unit 110. Modulators which may be important to speech applications include, but are not limited to, signal level, voice activity state (speech/silence), codec choice, packet "concealability," and other packet "importance" metrics. For video applications, different sets of modulators may apply. In all cases, however, modulators may be used to influence the action of the PI unit 110 to reflect a relative importance of each DFL event.

A series of modulators 200-203 preferably provides input to the modulation network 115 for each frame based on additional sources of information relating to the content of the media stream. The modulators 200-203 may be continuous-valued such as a signal level in decibels 200, or discrete-valued such as a speech/silence classification 203 which has only two possible values. The modulators 200-203 may be individually weighted. For example, the signal level 200 may be multiplied by a constant weight C1, the decoder distance 201 multiplied by a constant weight C2, the speech/silence state 203 multiplied by a weight CN, etc. The modulation network 115 then preferably sums up the individually-weighted contributions of each modulator 200-203. The modulation network 115 may further multiply the summed inputs by an overall scale coefficient S or final weight multiplier 210 to derive the overall modulation signal 116 corresponding to the overall "importance" of the DFL vector 63 at that moment to the PI unit 110.

At each processing cycle of the AVTQ device 100 (that is, as each element of the DFL vector 63 is clocked into the PI unit 110), a corresponding value of each of the modulators 200-203 is also clocked into the modulation network 115. For example, at the moment corresponding to the processing of the $999^{th}$ frame by a receiver, the $999^{th}$ frame was not present when needed by the speech decoder 70. Thus, the value of the DFL vector 63 may be a "1" corresponding to a loss. At this moment, or a little later on, the values of the various modulators 200-203 corresponding to the $999^{th}$ frame may also be captured. For example, the receiver voice activity detector 52 (FIG. 2) may report the signal as "silence" at input 203 with a signal level at −42 dB (very quiet) at input 200. At input 201, the speech decoder 70 may report that the $999^{th}$ packet is very similar to both the $998^{th}$ and the $1000^{th}$ packet, which means that PLC may likely be very effective for this lost packet. This refers to a "decoder distance" metric, which reflects the "concealability" of a particular lost packet. If the decoder distance is high, the signal was changing rapidly and the lost packet will be hard to conceal; thus, the user is more likely to notice the lost packet. If the decoder distance is low, the signal was relatively constant and PLC will probably be effective; thus, the human listener will probably not notice the lost packet. Since the decoder distance for the $999^{th}$ packet may not be available until the next valid frame has been decoded (frame 1000 in this example), processing in the AVTQ device 100 is preferably performed after some time delay, in order for all the relevant statistics to be captured.

In one embodiment, the modulation signal 116 may be constrained by a limiter 220 to lie within a range, for example, [0, 10]. The limiter 220 preferably causes input values below a predetermined low threshold to result in an output equal to the low threshold. Input values greater than a predetermined high threshold may be limited to produce an output equal to the high threshold. The values of the constant coefficients C1 to CN, S, and the limiter thresholds are preferably controlled by the Configuration Storage and Control Unit 160 and may be set when the modulation network 115 is initialized.

In one embodiment, values of the modulation signal 116 greater than unity (one) may represent increasing importance; that is, this DFL event will receive more than a default weight in the PI unit 110. On the other hand, values of the modulation signal 116 lower than unity (one) may represent a diminution of the importance of this frame loss event. In the example above, the modulators 200-203 indicate that the loss of frame 999 is a low-audibility event—it occurred during silence, at a low level, and the decoder 70 has determined that PLC will be effective (i.e., decoder distance is low). Hence, the modulation signal 116 may be assigned a low value of 0.1, for example. Thus, the loss of frame 999 will be largely discounted in the PI unit 110 because the modulation network 115 has determined it to be of low importance.

In another example, a $9000^{th}$ frame in the call may also be lost. Corresponding to the loss of frame 9000, the receiver voice activity detector 52 may report at input 203 that the frame loss occurred during speech with the signal level at −5 dB (very high) at input 200. At input 201, the decoder 70 may report that the decoder distance is high; that is, the voice signal may be undergoing rapid change, such as a transition from an unvoiced sound to a voiced sound. Hence, the loss of the $9000^{th}$ frame may be difficult to conceal. In this example, the overall modulation signal 116 may be assigned a high value of 3, for example, to reflect the high importance of this frame loss event. Thus, the loss of frame 9000 will receive heavy weighting in the PI unit 110 and, compared to the loss of frame 999, will have a correspondingly greater effect on the subsequent MOS score 150.

As described above, the AVTQ device 100 may be embodied within the VoIP endpoints 17, 21. However, it will be apparent to those skilled in the art that the AVTQ device 100 or process may also be embodied in any mechanism capable of observing or estimating the input streams 63, 200-203 which form the input to the AVTQ device 100. In another embodiment, the input streams 63, 200-203 may be archived for processing by an AVTQ device 100 at a later time.

The AVTQ device 100 may observe objective metrics of transmission channel performance directly, as in the case of the AVTQ device 100 embedded in the voice gateway 17 or the IP telephone 21, or indirectly. One indirect method includes communicating the input streams 63, 200-203 from the VoIP endpoints 17, 21 to an AVTQ device 100 which may be located elsewhere. Another indirect method includes implementing a "virtual endpoint" in which a model of an endpoint may be used to estimate the values of the input streams 63, 200-203, by simulating the behavior of the endpoint given a particular observed sequence of IP packet information.

Having described exemplary embodiments of the invention, it should be apparent that modifications and variations can be made by persons skilled in the art in light of the above teachings. Therefore, it is to be understood that changes may be made to embodiments of the invention disclosed that are nevertheless still within the scope and the spirit of the claims.

The invention claimed is:

1. A device, comprising:
a primary integrator to utilize a recursion relation to generate an instantaneous estimate of user annoyance based on both a decoder vector that is a time-based series indicating occurrence of frame loss events in a received signal and a modulation signal associated with concealment of the frame loss events from user perception; and
a plurality of secondary integrators to process the instantaneous estimate of user annoyance for selected time intervals and generate a plurality of time-varying estimates of user annoyance valid over the selected time intervals.

2. The device of claim 1, further comprising:
a plurality of scaling modules adapted to scale the plurality of time-varying estimates of user annoyance valid over the selected time intervals and generate a corresponding plurality of estimates of user-perceived transmission quality.

3. The device of claim 1, further comprising:
a modulation network adapted to modify a sensitivity of the primary integrator to the occurrence of frame loss events in the received signal.

4. The device of claim 1, further comprising:
a modulation network adapted to generate the modulation signal corresponding to a the relative importance of a particular frame loss event to user annoyance, wherein the modulation signal is based on at least one of a signal level of a frame associated with the frame loss event, a similarity of the frame with adjacent frames in the received signal.

5. The device of claim 4, wherein the modulation network is further adapted to receive a plurality of modulators for generating the modulation signal, each modulator comprising an objective measure of a media content characteristic having an effect on the importance of the particular frame loss event relative to user annoyance.

6. The device of claim 5, wherein the modulation network is further adapted to assign a weight value to each of the plurality of modulators, the weight value corresponding to a relative effect of the modulator on the importance of the particular frame loss event to user annoyance.

7. The device of claim 6, wherein the modulation network is further adapted to sum the weight values of the plurality of modulators.

8. A receiver, comprising:
a de-jitter buffer to store data packets;
a decoder to request the data packets from the de-jitter buffer, the data packets sent from the de-jitter buffer to the decoder at constant intervals; and
a transmission quality device to utilize a recursion relation to generate an estimate of transmission quality as perceived by a user, based on a decoder vector that is a time-based series indicating occurrence of lost data packets from the de-jitter buffer to the decoder and a modulating signal associated with concealment of the lost data packets from user perception.

9. The receiver of claim 8, wherein the transmission quality device is further adapted to generate an instantaneous estimate of user annoyance based on the occurrence of lost data packets.

10. The receiver of claim 9, wherein the transmission quality device is further adapted to process the instantaneous estimate of user annoyance in selected time intervals and generate a plurality of time-varying estimates of user annoyance valid over the selected time intervals.

11. The receiver of claim 10, wherein the transmission quality device is further adapted to scale the plurality of time-varying estimates of user annoyance valid over the selected time intervals and generate a corresponding plurality of estimates of transmission quality as perceived by the user.

12. The receiver of claim 8, wherein the transmission quality device is further adapted to receive the modulating signal.

13. The receiver of claim 9, wherein the transmission quality device is further adapted to receive the modulating signal, and modify a value of the instantaneous estimate of user annoyance based on a relative importance of the lost data packet to user annoyance.

14. The receiver of claim 13, further comprising:
a packet loss concealment device adapted to generate the modulating signal according to a difficulty of concealing effects of the lost packet to the user.

15. The receiver of claim 13, further comprising:
an activity detector adapted to generate the modulating signal according to a presence of activity on a transmission connection.

16. The receiver of claim 15, wherein the activity detector is further adapted to generate the modulating signal according to a level of the received signal during the occurrence of the lost packet.

17. A method for estimating transmission quality as perceived by a user, comprising:
monitoring occurrence of lost packets in a received signal; and
utilizing a recursion relation to generate an instantaneous estimate of user annoyance based on a binary time-based series indicating the occurrence of lost packets in the received signal and based on a modulating signal associated with concealment of the lost packets from user perception.

18. The method of claim 17, further comprising:
generating a plurality of estimates of user annoyance valid in selected time intervals from the instantaneous estimate of user annoyance.

19. The method of claim 18, further comprising:
generating a plurality of estimates of the transmission quality as perceived by the user corresponding to the plurality of estimates of user annoyance valid in the selected time intervals.

20. The method of claim 17, further comprising:
modifying a value of the instantaneous estimate of user annoyance according to a relative importance of a corresponding lost packet to user annoyance.

21. The method of claim 20, further comprising:
receiving a plurality of modulating signals, each modulating signal comprising an objective measure of performance of a transmission connection and having an effect on the importance of the lost packet to user annoyance.

22. The method of claim 21, further comprising:
assigning a weight value to each of the plurality of modulating signals, the weight value corresponding to a relative effect of the lost packet to the transmission quality as perceived by a user.

23. The method of claim 22, further comprising:
summing the weight values of the plurality of modulating signals.

24. A device for estimating transmission quality as perceived by a user, comprising:
means for generating an instantaneous estimate of user annoyance with a recursion relation based on a time-based series indicating occurrence of frame loss events in a received signal and based on at least one modulator associated with concealment of the lost data packets from user perception; and
means for processing the instantaneous estimate of user annoyance in selected time intervals and generating a plurality of time-varying estimates of user annoyance valid over the selected time intervals.

25. The device of claim 24, further comprising:
means for scaling the plurality of time-varying estimates of user annoyance and generating a corresponding plurality of estimates of transmission quality as perceived by a user valid over the selected time intervals.

26. The device of claim 24, further comprising:
means for modifying a value of the instantaneous estimate of user annoyance according to a relative importance of a particular frame loss event to user annoyance.

27. The device of claim 26, wherein the means for modifying a value of the instantaneous estimate of user annoyance comprises means for receiving a plurality of modulators, each modulator comprising an objective measure of performance of a transmission connection.

28. The device of claim 27, further comprising:
means for assigning a weight value to each of the plurality of modulators, the weight value corresponding to a relative effect of the modulator to a user-perceived importance of the particular frame loss event.

29. The device of claim 28, further comprising:
means for summing the weight values of the plurality of modulators.

30. A system, comprising:
a receiver adapted to receive packets transmitted across a network; and
a transmission quality device to utilize a recursion relation to generate an estimate of transmission quality as perceived by a user according to a binary time-based series indicating occurrence of lost packets in the receiver and at least one modulating signal associated with concealment of the lost packets from user perception.

31. The system of claim 30, wherein the receiver includes the transmission quality device.

32. The system of claim 30, wherein the transmission quality device is remotely located from the receiver.

33. The system of claim 30, wherein the receiver comprises:
a de-jitter buffer adapted to store packets received at random intervals; and
a decoder adapted to request the stored packets from the de-jitter buffer, the packets sent from the de-jitter buffer to the decoder at constant intervals.

34. The system of claim 33, wherein the transmission quality device generates the estimate of transmission quality as perceived by the user based on occurrence of lost data packets from the de-jitter buffer to the decoder.

35. The system of claim 30, wherein the transmission quality device is further adapted to receive a plurality of modulating signals for modifying the estimate of transmission quality as perceived by the user, each modulating signal corresponding to an objective measure of performance of a transmission connection and having an effect on the importance of the lost packets.

\* \* \* \* \*